United States Patent
Chikugo et al.

(10) Patent No.: US 8,110,313 B2
(45) Date of Patent: Feb. 7, 2012

(54) FUEL CELL SYSTEM

(75) Inventors: Hayato Chikugo, Yokosuka (JP);
Kenichi Goto, Zama (JP)

(73) Assignee: Nissan Motor Co., Ltd, Yokohama-shi, Kanagawa (JP)

( * ) Notice: Subject to any disclaimer, the term of this patent is extended or adjusted under 35 U.S.C. 154(b) by 578 days.

(21) Appl. No.: 12/160,269

(22) PCT Filed: Jan. 11, 2007

(86) PCT No.: PCT/IB2007/001718
§ 371 (c)(1),
(2), (4) Date: Sep. 29, 2008

(87) PCT Pub. No.: WO2007/105112
PCT Pub. Date: Sep. 20, 2007

(65) Prior Publication Data
US 2009/0035613 A1 Feb. 5, 2009

(30) Foreign Application Priority Data
Jan. 11, 2006 (JP) ................................ 2006-003574

(51) Int. Cl.
*H01M 8/04* (2006.01)
(52) U.S. Cl. .................. 429/442; 429/432; 429/434
(58) Field of Classification Search .................. 429/432, 429/433, 434, 442
See application file for complete search history.

(56) References Cited

U.S. PATENT DOCUMENTS

| | | | |
|---|---|---|---|
| 6,087,028 A | 7/2000 | Goto | |
| 6,497,971 B1 * | 12/2002 | Reiser | 429/432 |
| 2003/0003330 A1 | 1/2003 | Ballantine et al. | |

FOREIGN PATENT DOCUMENTS

| | | |
|---|---|---|
| EP | 1 271 681 A2 | 1/2003 |
| JP | 63-143756 | 6/1988 |
| JP | 04-315774 | 11/1992 |
| JP | 08-315844 | 11/1996 |
| JP | 10-294120 | 11/1998 |
| JP | 2005-150019 | 6/2005 |
| JP | 2006244758 * | 9/2006 |
| WO | 2005/008821 A2 | 1/2005 |

* cited by examiner

*Primary Examiner* — Ula C. Ruddock
*Assistant Examiner* — Thomas H. Parsons
(74) *Attorney, Agent, or Firm* — Young Basile (57) ABSTRACT

The present invention provides a fuel cell system having means for controlling the flow of coolant within a fuel cell system. A desirable rate of flow of coolant is created, during power generation, by determining the difference in temperature between coolant flowing into individual cell sets of the fuel cell assembly and the temperature of coolant exhausted from the cell assembly. The fuel cell system features controls adapted to evaluate the heat generation state of each fuel cell set and to regulate the temperature of cell sets by controlling the rate circulation of the coolant.

17 Claims, 10 Drawing Sheets

FUEL CELL SYSTEM

CROSS-REFERENCE TO RELATED APPLICATIONS

This application claims priority to Japanese Patent Application No. 2006-003574 filed on Jan. 11, 2006. The entire disclosure of Japanese Patent Application No. 2006-003574 is hereby incorporated herein by reference.

FIELD OF THE INVENTION

The present invention relates generally to fuel cell systems, and more specifically, to a fuel cell system capable of controlling the temperature of a fuel cell by circulation of a coolant.

BACKGROUND OF THE INVENTION

In a conventional fuel cell system (see Japanese Patent Application Laid-Open No. H09-259909, for example), air, fuel gas, and coolant are each fed to the system's fuel cell stacks through a single feeding pipe and are also merged into a single exhaust pipe upon being expelled from the system. In this case, the volume of coolant is controlled in accordance with a flow volume parameter provided to the single pipe on each of the feed and exhaust sides.

Generally, these types of conventional fuel cell systems focus primarily on the heat generation of the system as a whole and do not take into consideration the efficiency of individual cell sets within the cell system. Individual cell sets within a fuel cell system however may deteriorate at different rates over time. As a result, certain cell sets may become less efficient and thus generate more heat than others during operation of the cell system. When this occurs, the heating value of the less efficient cell sets increases such that it becomes more difficult to maintain or control the temperature of the fuel cell stacks within a specified or even acceptable tolerance range.

SUMMARY OF THE INVENTION

In order to solve the problems described above, the present invention provides a fuel cell system that estimates a cell-set temperature difference or a difference in temperature between coolant flowing into a fuel cell assembly and the temperature of coolant exhausted from the cell assembly. By measuring the voltage of an individual cell set within the cell assembly through the use of voltage sensors and evaluating the voltage values with the cell-set temperature difference, the present invention is able to obtain a more accurate determination as to the amount of heat generated by an individual fuel cell set. The cell system of the present invention additionally features a control unit that is able to adjust the amount of coolant delivered to the fuel cell assembly in response at least to the estimated cell-set temperature difference, and thereby control the temperature thereof.

According to the fuel cell system of one embodiment of the present invention, the temperature difference between the inflow and outflow temperatures in the fuel cell set is estimated by evaluating the voltages of the individual fuel cell sets and the inflow temperature of the coolant flowing into the fuel cell assembly. Consequently, the heat generation state of each fuel cell set can be detected, and the heating value in each fuel cell set can be controlled to within an allowable range.

A method of controlling a fuel cell is further provided by the present invention. The method features the steps of detecting a cell-set voltage value, in units, at an individual fuel cell set; detecting the inflow temperature of the coolant flowing into the fuel cell assembly; transmitting the detected voltage values and temperature as a signal to be received by a control unit; estimating the cell-set temperature difference from the detected voltage values and temperature; determining a heat generation output value of the individual cell sets; evaluating the heat generation output value against a predetermined value; and directing responsive components of the fuel cell assembly to operate in a manner sufficient to maintain or return the temperature of the fuel cell assembly to within a predetermined range.

DETAILED DESCRIPTION OF THE DRAWINGS

While the present invention is susceptible of embodiment in various forms, there is shown in the drawings a number of presently preferred embodiments. It should be understood that the present disclosure is to be considered as an exemplification of the present invention, and is not intended to limit the invention to the specific embodiments illustrated. It should be further understood that the title of this section of this application ("Detailed Description of the Drawings") relates to a requirement of the United States Patent Office, and should not be found to limit the subject matter disclosed herein.

Figure 1:
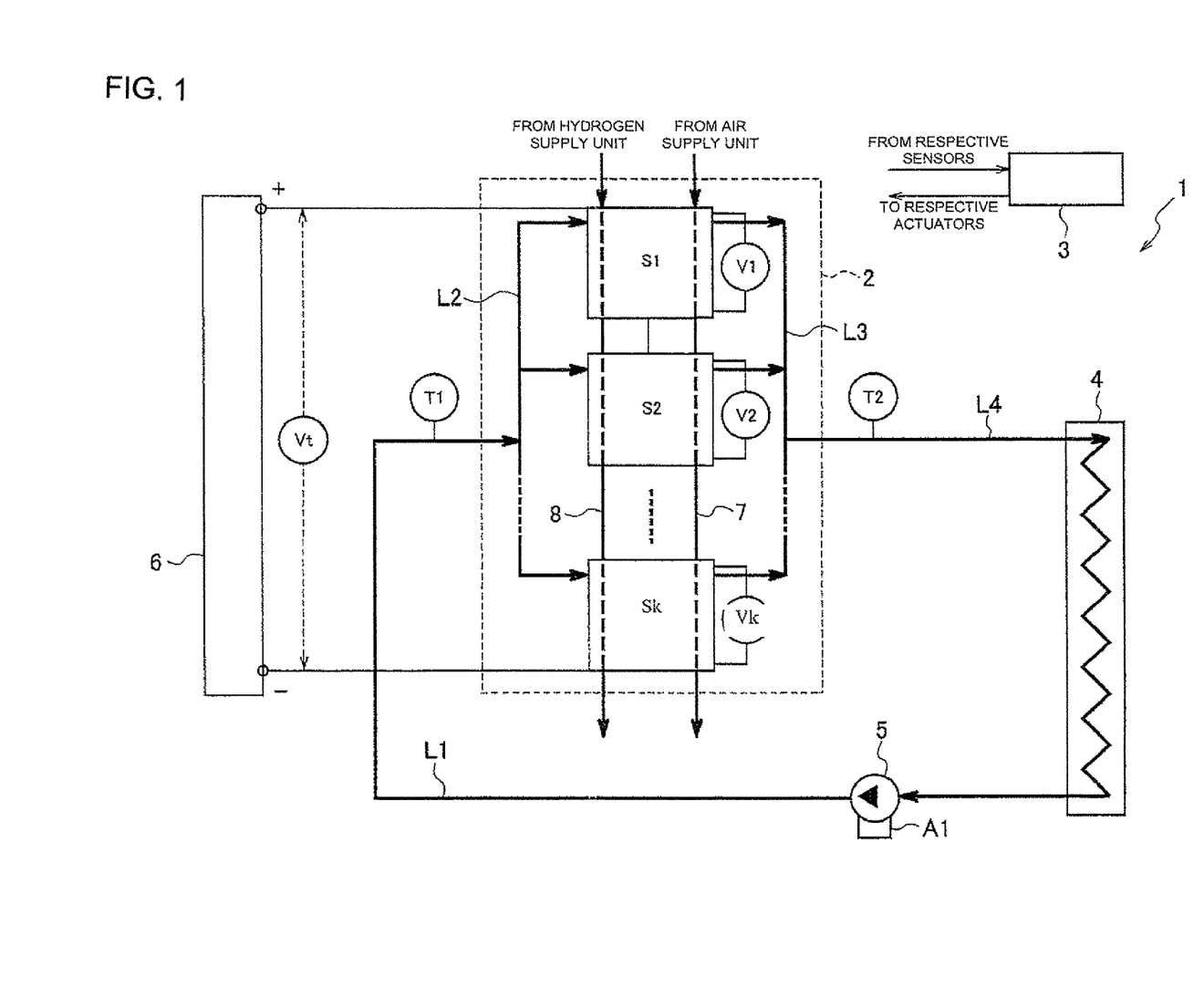
FIG. 1 is a block diagram showing the configuration of a fuel cell system according to a first embodiment of the present invention.

With reference now to the drawings, FIG. 1 is a block diagram showing the configuration of a fuel cell system 1 made in accordance with one embodiment of the present invention. Generally, the system 1 of the present embodiment can include: a fuel cell assembly 2, a control unit 3, cell set voltage sensors V1 to Vk, a coolant circulation system featuring a coolant supply pathway L1, a coolant distribution flow pathway L2, a coolant merging flow pathway L3, and a coolant exhaust flow pathway L4.

The circulation system can further include an inlet temperature sensor T1, an outlet temperature sensor T2, a power converter 6 and an output voltage sensor Vt. Additionally, the embodiment of FIG. 1 can include a coolant cooling unit, such as for example a radiator 4, a coolant circulation pump 5, and a pump actuator A1. Operation of these responsive components can be controlled by a control unit 3, in order to adjust the amount of coolant delivered to the fuel cell assembly in response to a detected amount of heat being generated by the system.

As shown in FIG. 1, the fuel cell assembly 2 includes a plurality of electrically connected fuel cell sets (S1 to Sk), that each generate power through electrochemical reaction between a fuel gas and an oxidant gas. A plurality of cell set voltage sensors V1 to Vk are further provided in order to detect the individual voltages at each fuel cell set S1 to Sk and to transmit the detected voltage as a signal.

The control unit 3 includes an arithmetic, or computational unit and controls the fuel cell system 1. The cell set voltage sensors V1 to Vk measure the individual cell set voltages of the respective fuel cell sets S1 to Sk. The coolant supply flow pathway L1 supplies a coolant from the radiator 4 to the coolant distribution pathway L2, which distributes coolant to the plurality of fuel cell sets S1 to Sk. The coolant merging flow pathway L3 merges or combines coolant flowing out from the individual fuel cell sets S1 to Sk and delivers the coolant to the exhaust flow pathway L4. The exhaust flow pathway L4 in turn exhausts the coolant from the fuel cell assembly 2 and returns it to the radiator.

The radiator 4 removes heat from the coolant passing through it and thereby dissipates the heat produced by system 1 during power generation thereby cooling the coolant. The pump actuator A1 actuates the coolant circulation pump 5, which circulates the coolant through the coolant circulation system. While the circulation pump 5 shown in FIG. 1 is arranged upstream of the coolant supply flow pathway L1, those having ordinary skill in the art will understand that it can be positioned in almost any location along the coolant circulation system without departing from the novel scope of the present invention.

The inlet temperature sensor T1 senses and detects the inflow temperature of the coolant, which is the temperature of the coolant flowing into the fuel cell assembly 2. Cooperatively, the outlet temperature sensor T2 senses and detects the outflow temperature of the coolant, which is the temperature of the coolant flowing out from the fuel cell assembly 2. Uses of the sensed and detected temperatures derived from these sensors will be discussed in greater detail below. Similar to the cell set voltage sensors, V1 to Vk, the inlet and outlet temperature sensors (T1 and T2 respectively) are adapted to transmit the sensed temperatures as signals to the control unit 3. The power converter 6 converts power drawn from the fuel cell assembly 2 to an appropriate form of power. The output voltage sensor Vt senses and detects an output voltage of the fuel cell assembly 2.

As shown in FIG. 1, in the fuel cell assembly 2 of the fuel cell system 1, hydrogen gas used as a fuel gas is supplied to a fuel electrode. Air used as an oxidant gas is supplied to an oxidant electrode. Power generation is carried out through an electrochemical reaction shown below:

$$\text{Anode(fuel electrode)}: H2 \rightarrow 2H+ +2e- \qquad (1)$$

$$\text{Cathode(oxidant electrode)}: 2H+ +2e- +(\tfrac{1}{2})O2 \rightarrow H2O \qquad (2)$$

In the present embodiment of the invention, the fuel cell assembly 2 has a configuration in which the plurality of fuel cells are stacked through separators, in which the fuel cells are formed such that a polymer electrolyte is sandwiched between the oxidant electrode and the fuel electrode. That is, the fuel cell assembly 2 of the present embodiment is separated into the plurality of fuel cell sets S1 to Sk. In this configuration, the plurality of fuel cell sets S1 to Sk are electrically connected in parallel.

Inside the individual fuel cell sets S1 to Sk, there are provided an oxidant gas flow pathway 7 that permits the air (oxidant gas) to pass, and a fuel gas flow pathway 8 that permits the fuel gas to pass. The oxidant electrode is supplied with air (oxidant gas) from an air supply unit such as a compressor (not shown). The fuel electrode is supplied with hydrogen gas (fuel gas) from a fuel supply unit such as a hydrogen tank (not shown). In a fuel cell assembly 2 thus configured, ions of both the oxidant and fuel gases move inside a polymer electrolyte with water being used as a medium. The ions of the respective gases come in contact with one another and react to generate power. The number of fuel cells constituting the respective fuel cell sets S1 to Sk can be arbitrary and within the range of from one to a number smaller than or equal to the total number of the cells.

The power thus generated from the fuel cell assembly 2, through the above-described reaction, is then converted by the power converter 6, to an appropriate form of power corresponding to a contemplated power load thereby to be utilizable. For example, in circumstances where the fuel cell system 1 of the present embodiment is used for a fuel-cell dedicated motor vehicle using an AC (alternating current) electric motor, the generated power is converted to AC power of a necessary voltage and frequency and is output from the system 1 for utilization by the motor vehicle.

As previously noted, coolant is supplied to the fuel cell assembly 2 for dissipation of heat generated by the power generation of the fuel cell assembly 2. Coolant is then distributed to the individual fuel cell sets S1 to Sk through the coolant distribution flow pathway L2, in order to cool the respective fuel cell sets S1 to Sk. The coolant having absorbed the heat through cooling of the fuel cell sets S1 to Sk is merged into the coolant exhaust flow pathway L4 through the coolant merging flow pathway L3. Subsequently, the heat is dissipated by the radiator 4 to the outside of the fuel cell system 1, and the coolant is cooled and recirculated. The coolant is circulated through the coolant circulation system by the circulation pump 5 which, when activated by the pump actuator A1 propels the coolant between the fuel cell assembly 2 and the radiator 4. In the present configuration, the coolant circulation system is formed by the coolant supply flow pathways L1 to L4.

In the present embodiment of the invention, the individual fuel cell sets S1 to Sk feature cell set voltage sensors V1 to Vk to sense and detect potential differences (voltages) resulting from the power generation reactions occurring at the individual fuel cell sets S1 to Sk. Similarly, the output voltage sensor Vt is provided to the fuel cell assembly 2, in order to measure the output voltage of the fuel cell assembly 2. In addition, the inlet temperature sensor T1 is provided at the coolant supply flow pathway L1, in order to sense and detect the inflow temperature of the coolant flowing into the fuel cell assembly 2. Similarly, the outlet temperature sensor T2 is provided at the coolant supply flow pathway L4, so as to sense and detect the outflow temperature of the coolant flowing out from the fuel cell assembly 2.

As noted above, the voltage and temperature values detected by the respective voltage and temperature sensors are conveyed from the sensors in the form of signals to the control unit 3. At the control unit 3 the voltages signals received, from the respective cell set voltage sensors V1 to Vk, are recognized as cell-set voltages of the individual fuel cell sets S1 to Sk, respectively. The voltage signal transmitted by the output voltage sensor Vt is recognized as an output voltage of the fuel cell assembly 2. Similarly, the control unit 3 recognizes the signals transmitted by the respective inlet and outlet temperature sensors T1 and T2 as the inflow and outflow temperatures of the coolant flowing respectively into and out of the fuel cell assembly 2. In receiving the voltage and temperature signals from the respective sensors, the control unit 3 functions, in accordance with the mechanisms described below, to evaluate the heat generation value of each fuel cell set and to control the power generation output of the fuel cell assembly and/or the amount of coolant circulated through the coolant circulation system.

In the present embodiment, the control unit 3 can be a microcomputer, comprising among other things, a central processing unit (CPU), a random access memory (RAM), a read-only memory (ROM), and an input/output interface (I/O interface). These components permit the control unit 3 to monitor and direct the operation of individual components of the fuel cell system, such as the power converter 6 and the pump actuator A1, and thus can enable the control unit 3 to control the total operation of the fuel cell system 1. The control unit 3 can further be configured of a plurality of microcomputers so as to execute not only the above-described control process, but also a plurality of additional control processes, as will be understood by persons having ordinary skill in the art. It will also be understood that other control means, which are well known by persons having ordinary skill in the art, can be substituted for a microcomputer, or plurality of microcomputers, without departing from the novel scope of the present invention.

The control unit 3 of one embodiment of the present invention additionally features an arithmetic, or computational, unit for determining the cell-set temperature difference, which, as stated above, is the difference in temperature between the coolant being delivered to the fuel cell sets (S1 to Sk) and that of the coolant being exhausted from the fuel cell assembly 2. The present invention enables the cell-set temperature difference to be determined at each individual fuel cell set, S1 to Sk, by evaluating a heating value of a particular cell set, a flow volume of the coolant flowing into the cell set, and a specific heat of the coolant flowing through the cell set. In considering such factors, the fuel cell-set temperature difference can be determined by relational equation (3):

$$Qgn = Qon = Ln \times C \times (Tson - Tnin) \quad (3)$$

where, Qgn denotes a heating value of the fuel cell set; Qon denotes an amount of heat transferred from the fuel cell set; Ln denotes a flow volume of the coolant flowing into the fuel cell set; C denotes a specific heat of the coolant; and Tson−Tnin denotes a cell-set temperature difference.

In addition to relational equation (3), the arithmetic, or computational, unit of control unit 3 can perform a number of other relational equations in order to calculate the cell-set temperature difference. For example the heating value of each fuel cell set can be determined from the relationship between the theoretical heating value and the efficiency of the particular cell set. As such, the heating value can be estimated from a theoretical electromotive voltage, power generation voltage, and power generation current of the fuel cell using hydrogen and oxygen. Accordingly, the heating value of a particular cell set can be estimated from relational equation (4):

$$Qgn = I \times (VOn - Vn) \times Nn \quad (4)$$

where, Qgn denotes a heating value of the fuel cell set; I denotes a power generation current; VOn denotes a theoretical electromotive voltage; Vn denotes a cell-set voltage; and Nn denotes the number of cells of the cell set.

Similarly, when heat transfer of the entire fuel cell assembly 2 is taken into consideration, the total heating value of the fuel cell assembly 1 as a whole can be calculated using relational equation (5):

$$Qg = Qo = L \times C \times (Tout - Tin) \quad (5)$$

where, Qg denotes a total heating value of the fuel cell assembly; Qo denotes an amount of heat transferred from the fuel cell assembly; L denotes a total flow volume of the coolant; C denotes a specific heat of the coolant; and Tout−Tin denotes a difference between the coolant temperatures at the inlet and the outlet of the fuel cell assembly.

Alternatively, the total heating value of the fuel cell assembly 1 as a whole can be determined by relational equation (6):

$$Qg = I \times (VOn - Vt) \times N \quad (6)$$

where, Qg denotes a total heating value of the fuel cell assembly; I denotes a power generation current; VOn denotes a theoretical electromotive voltage; Vt denotes a total voltage; and N denotes the number of cells of the fuel cell assembly.

Generally, the coolant flowing through the coolant circulation system will not undergo additional heating or cooling between the inlet of the fuel cell assembly and the individual fuel cell sets. Accordingly, the control unit 3 of the present invention can estimate, according to relational equation 7 below, the inflow temperature of the coolant flowing into the individual fuel cell sets S1 to Sk by measuring the temperature of the coolant at the inlet of the fuel cell assembly 2.

$$Tin = Tnin \quad (7)$$

Additionally, because coolant is considered to flow into the respective fuel cell sets S1 to Sk in a uniform manner, the sum of the inlet flow volume will be equal to the total flow volume according to relational equation (8):

$$L = \Sigma(Ln) \quad (8)$$

The output voltage of the fuel cell assembly 2 of the present invention corresponds to the total of the cell-set voltages of the individual fuel cell sets S1 to Sk. Accordingly, the arithmetic, or computational, unit can calculate the output voltage of the fuel cell assembly by performing a calculation exemplified by relational equation (9,) shown below, in which each of the respective cell-set voltage values detected at the individual fuel cell sets are summed.

$$Vt = \Sigma(Vn) \quad (9)$$

When relational equations (3) to (9) are used, the arithmetic, or computational, unit of the present invention can determine the cell-set temperature difference (Tson−Tin) by performing a calculation according to relational equation (11):

$$Tson - Tin = k(VOn - Vn) / \{\Sigma(VOn) - Vt\} \times (Tout - Tin) \quad (11)$$

It will be seen that in relational equation (11), the voltage difference between the cell-set voltage and a predetermined voltage is divided by the voltage difference between the output voltage and a predetermined voltage to obtain a value, the value is then multiplied by the assembly temperature difference and again by the number of fuel cell sets.

Further, when the value for Tin is known, a cell-set outflow temperature Tson, which is the temperature of the coolant flowing out from the respective fuel cell sets S1 to Sk, can be calculated from relational equation (11).

Alternatively, without using relational equation (11), the arithmetic or computational unit can perform a calculation according to relational equation (10) shown below. By performing this equation, the arithmetic, or computational, unit estimates the cell-set temperature difference (Tson−Tin), by considering the specific heat of the coolant.

$$Tson-Tin(VOn-Vn) \times I/C/L \qquad (10)$$

In relational equation (10), a voltage difference between the individual cell set voltages V1 to Vk and a predetermined voltage is multiplied with the power generation current of the fuel cell sets S1 to Sk to obtain a value. The value is then divided by the specific heat and then divided again by the desired flow rate of the coolant flowing into the fuel cell set. Accordingly, the cell-set temperature difference can be determined by using, for example, physical properties of the coolant and can thus be estimated with even higher accuracy.

Figure 2:
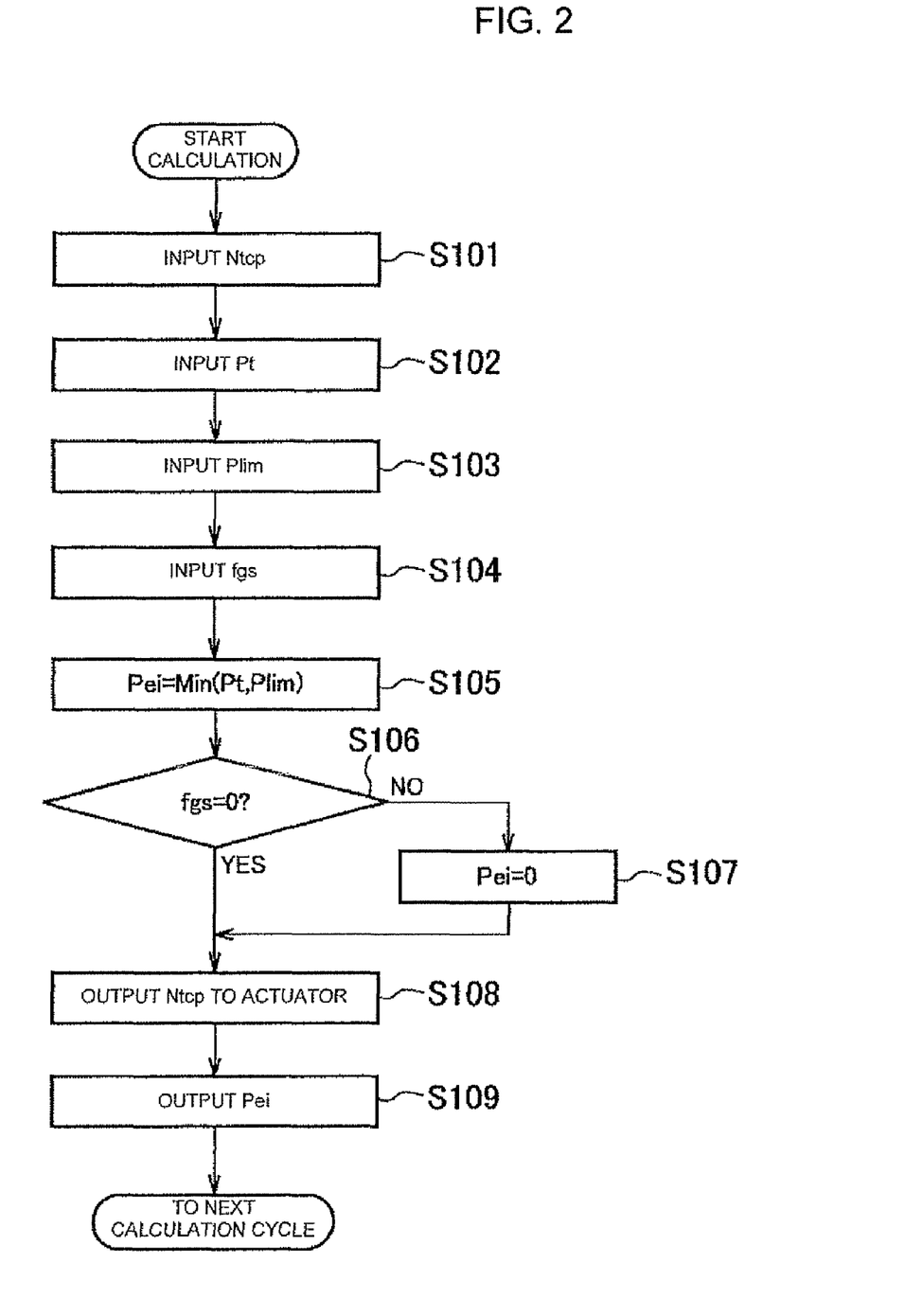
FIG. 2 is a flow chart showing a calculation process for controlling the fuel cell system according to the first embodiment of the invention.

Referring now to FIG. 2, a flow chart featuring a process of controlling the fuel cell system 1 of one embodiment of the present invention is shown. The system control process is interactively executed by the control unit 3 in units of a predetermined control cycle Tc (which, as will be discussed below, is similar in other embodiments of the present invention). As shown in FIG. 2, at the outset of the illustrated process, an object rotation speed Ntcp of the coolant circulation pump 5 is input (step S101). A method of calculating the object rotation speed Ntcp will be described later. A command power Pt datum for the fuel cell assembly 2 is then input (step S102), and a limited power Plim datum, determined from the temperature of the fuel cell assembly 2, is input (step S103). In the present embodiment an output limitation is not imposed on the temperature, and instead the process is executed assuming that the limited power Plim datum is the same as the command power Pt datum.

Subsequently, a power generation termination flag fgs is read (step S104). The power generation termination flag fgs is set either to "1" to terminate power generation, or alternatively to "0" to carry out power generation. A method of setting the power generation termination flag fgs will be described further below.

The next step of the process involves selecting the smaller value between the command power Pt datum and the limited power Plim datum, which is calculated to be an object extraction power Pei of the power converter 6 (step S105). A determination is then made as to whether or not the power generation termination flag fgs is set to "0" (step S106). If the power generation termination flag fgs is not set to "0," but is instead set to "1", the object extraction power Pei is set to "0" (step S107).

Thus, if either the power generation termination flag fgs is "0" or the object extraction power Pei is "0", the object rotation speed Ntcp of the coolant circulation pump 5 is output to the pump actuator A1 (step S108). The object extraction power Pei datum is then output to the power converter 6 (step S109). In this event, if in step S106, the power generation termination flag fgs is "0", the smaller value between either the command power Pt and the limited power Plim data is output. Alternately, if the power generation termination flag fgs is "1", the object extraction power Pei is then set to "0". As the object extraction power Pei relates to output, processing shifts to a next calculation cycle, and the control process in the fuel cell system 1 terminates.

The calculation process for the object rotation speed Ntcp of the coolant circulation pump 5, which is used in the system control process, will now be described with reference to a flow chart of FIG. 3.

Figure 3:
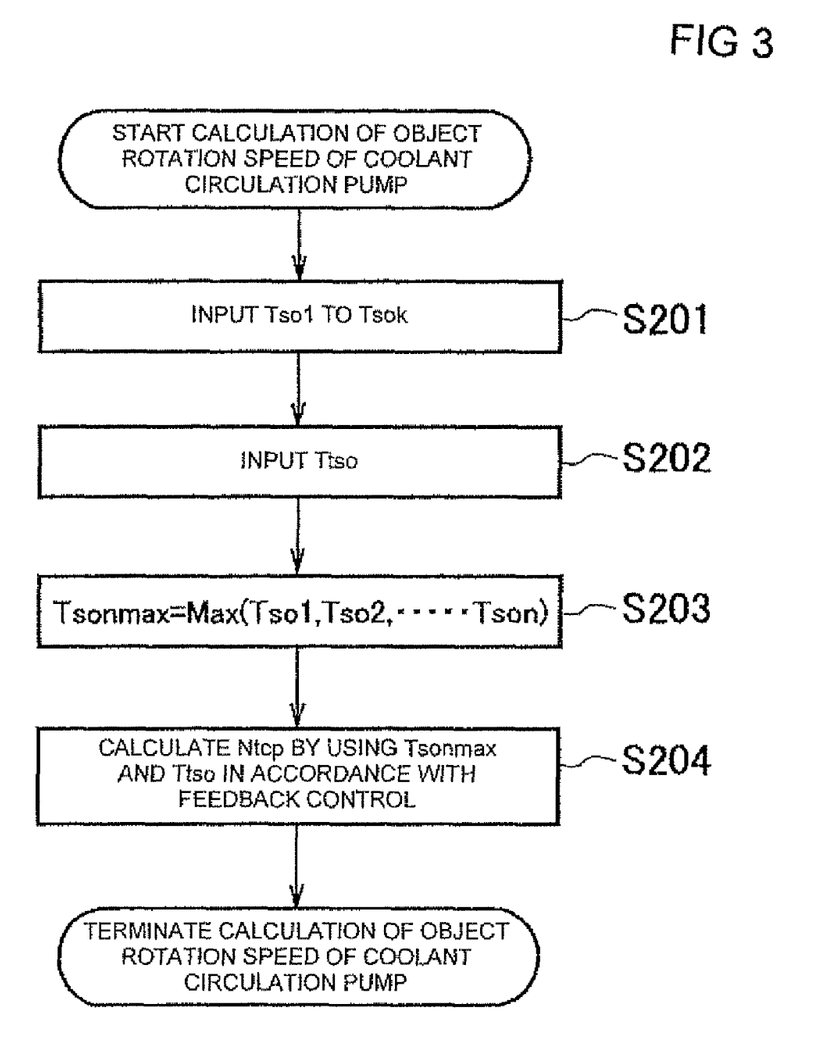
FIG. 3 is a flow chart showing a process for calculating an object rotation speed of a coolant circulation pump in the fuel cell system according to the first embodiment of the invention.

Referring now to FIG. 3, a flow chart showing a calculation process for an object rotation speed of a coolant circulation pump 5 in the fuel cell system 1, in accordance with the first illustrative embodiment of the invention, is shown. At the outset of the illustrated process, the cell-set outflow temperatures Tso1 to Tsok detected at the coolant outlets of the respective fuel cell sets S1 to Sk are input (step S201). A method of calculating the cell-set outflow temperatures Tso1 to Tsok will be described later. Alternatively, the cell-set temperature differences can be used instead of the cell-set outflow temperatures Tso1 to Tsok. An object value Ttso of the cell-set outflow temperatures is then input (step S202). The highest cell-set outflow temperature is then selected from the individual cell-set outflow temperatures Tso1 to Tsok. This value is represented as Tsonmax (step S203).

Following the determination of the maximum outflow temperature, feedback control, which is represented, for example, by PI (proportional-plus-integral) control, is carried out by the use of the obtained maximum value Tsonmax and object value Ttso in order to calculate the object rotation speed Ntcp of the coolant circulation pump 5 (step S204). After this calculation is performed, the calculation process for the object rotation speed Ntcp of the coolant circulation pump 5 is terminated.

Figure 4:
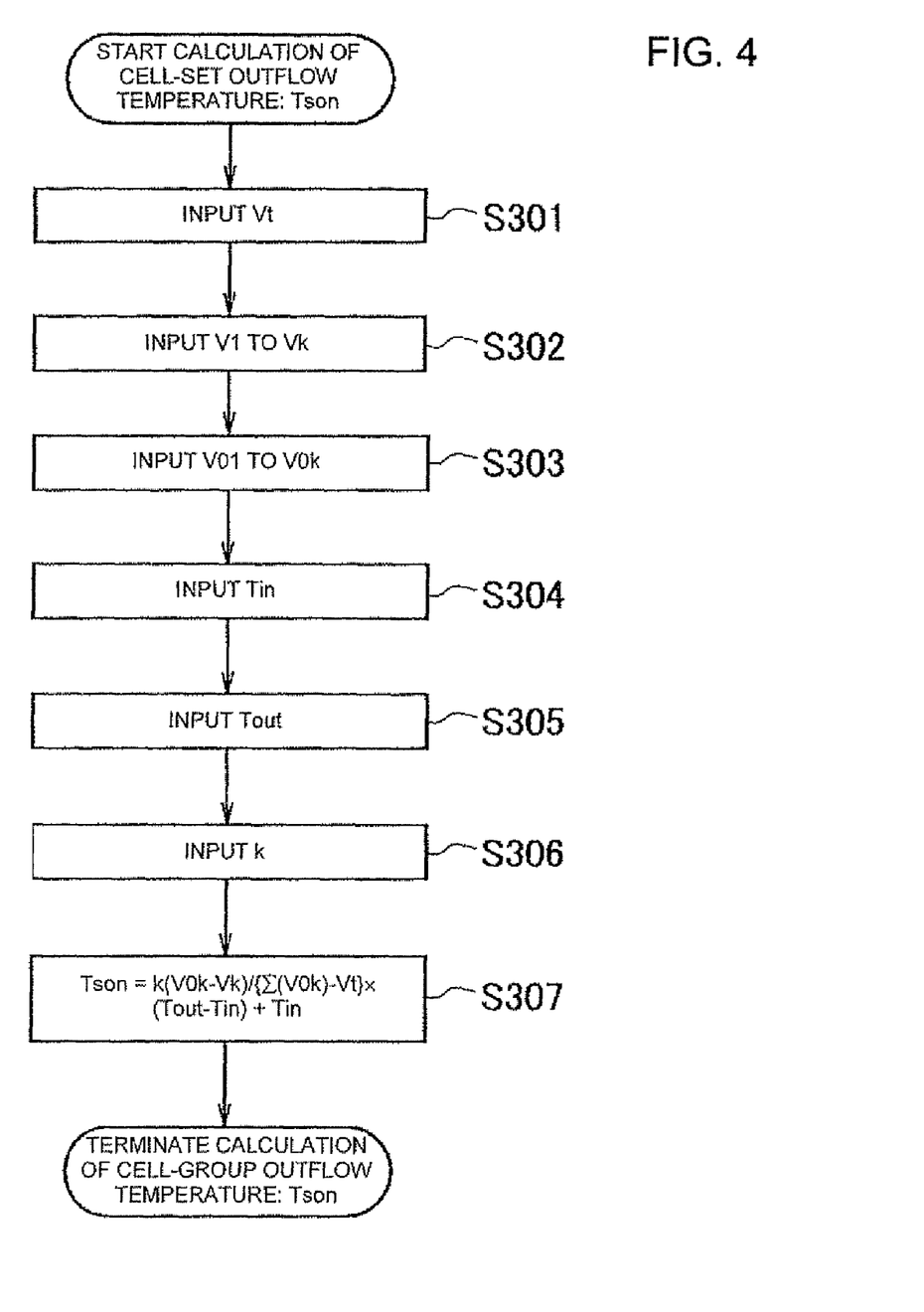
FIG. 4 is a flow chart showing a process for calculating a cell-set outflow temperature in the fuel cell system according to the first embodiment of the invention.

In FIG. 4, a flow chart illustrating the calculation process for determining the cell-set outflow temperatures Tson is shown. At the outset of the illustrated process, an output voltage Vt of the fuel cell assembly 2 detected by the output voltage sensor Vt is input (step S301). Respective cell set voltages V1 to Vk of the fuel cell sets S1 to Sk, which were detected by the corresponding cell set voltage sensors V1 to Vn are then input (step S302). Reference voltages V01 to V0n for the individual fuel cell sets S1 to Sk are then input (step S303). The respective reference voltages V01 to V0k are representative values of characteristics defined in accordance with the particular type of the fuel cell being used and the number of cells contained therein, and are preliminarily stored as control constants in the control unit 3. In the illustrative embodiment, a value detected by the output voltage sensor Vt is used as the output voltage Vt of the fuel cell assembly 2. However, the value can be obtained by totaling the respective values measured by the cell set voltage sensors V1 to Vk.

The inflow temperature Tin of the coolant flowing into the fuel cell assembly 2 as detected by the inlet temperature sensor T1 is then input (step S304). Then, an outflow temperature Tout, of the coolant flowing out from the fuel cell assembly 2 detected by the outlet temperature sensor T2, is then input (step S305). The number (k) of the fuel cell sets S1 to Sk is input in the following step (step S306). Thereafter, the cell-set outflow temperature Tson of the fuel cell set Sk is calculated using the input values in accordance with equation (12) shown below (step S307).

$$Tson = k(V0n-Vn)/\{\Sigma(V0n)-Vt\} \times (Tout-Tin) + Tin \qquad (12)$$

In this manner, individual cell-set outflow temperatures Tso1 to Tsok of each of the fuel cell sets S1 to Sk are calculated, and the calculation process for the cell-set outflow temperatures Tson terminates.

Figure 5:
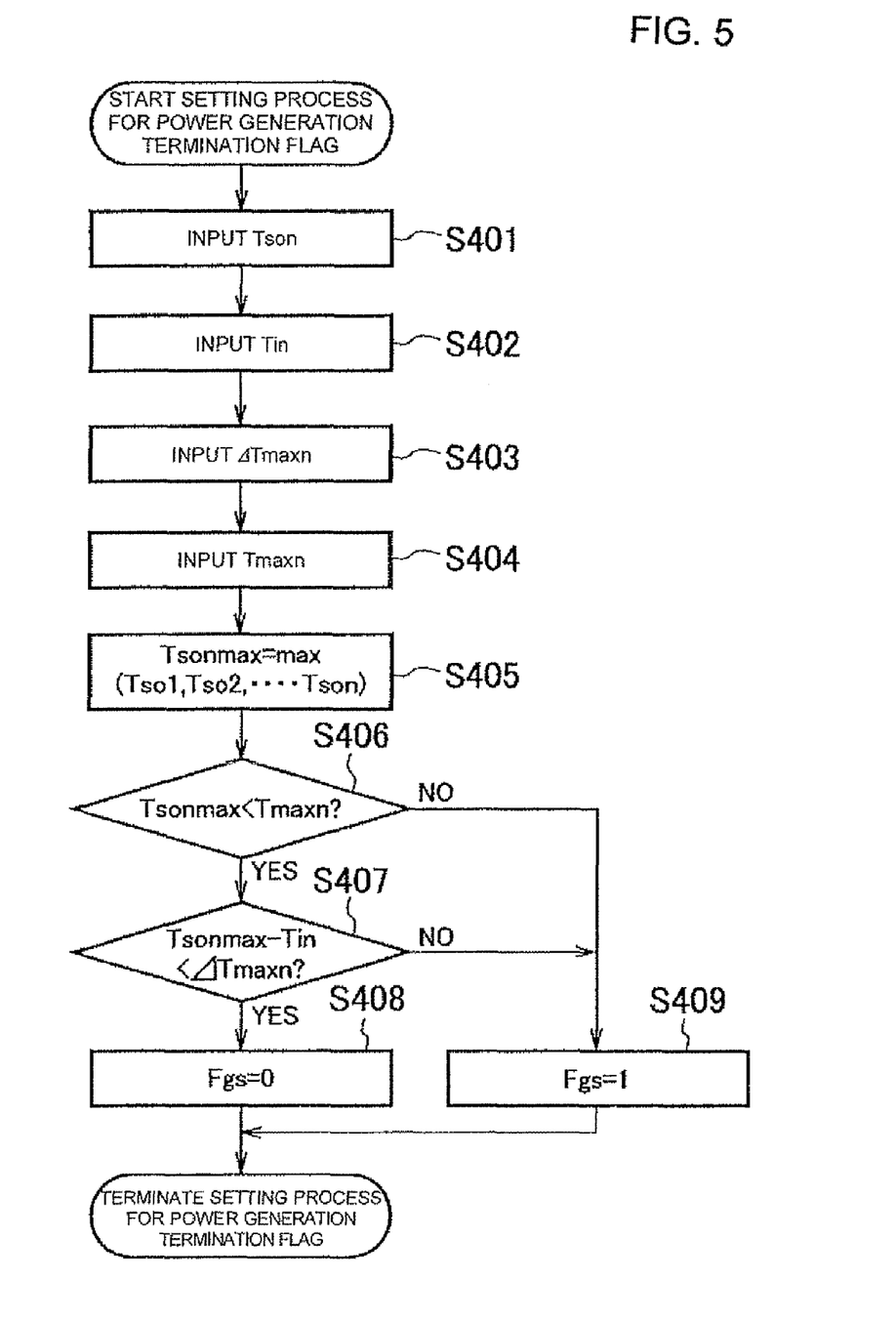
FIG. 5 is a flow chart showing a process for setting a power generation termination flag in the fuel cell system according to the first embodiment of the invention.

A method of setting the power generation termination flag fgs for preventing temperature elevation will be described hereinbelow with reference to the flow chart of FIG. 5. This process is executed in units of a predetermined period of time while the fuel cell assembly generates power. Referring now to FIG. 5, at the outset, the cell-set outflow temperatures Tso1 to Tsok of the respective fuel cell sets S1 to Sk are input (step S401). Then, the inflow temperature Tin of the coolant flowing into the fuel cell assembly 2 is input (step S402). Those having ordinary skill in the art will understand that the cell-set temperature differences described above can be used instead of the cell-set outflow temperatures Tso1 to Tsok. A design maximum value ΔTmaxn of the cell-set temperature difference of the coolant in the individual fuel cell sets S1 to Sk is input (step S403) Then, a design maximum value Tmaxn of the cell-set outflow temperature from the respective fuel cell sets S1 to Sk is input (step S404).

The input cell-set outflow temperature Tso1 to Tsok having the largest value is then selected as Tsonmax (step S405). After which, a comparison is made between the maximum value Tsonmax and the maximum value Tmaxn of the cell-set outflow temperature (step S406). If the maximum value Tmaxn of the cell-set outflow temperature is greater, the difference between the maximum value Tsonmax and the inflow temperature Tin (Tsonmax−Tin) is compared with the maximum value ΔTmaxn of the cell-set temperature difference (step S407). If the maximum value ΔTmaxn of the cell-set temperature difference is greater, the control unit causes power generation by the fuel cell assembly to terminate by setting the power generation termination flag fgs is set to "0" (step S408), and the setting process for the power generation termination flag fgs is terminated. Alternatively, if in step 40G, the maximum value Tsonmax is greater than the maximum value Tmaxn of the cell-set outflow temperature, and if the difference (Tsonmax−Tin) is greater than the maximum value ΔTmaxn of the cell-set temperature difference (Step S407), then the power generation termination flag fgs is set to "1" (step 409) and the setting process for the power generation termination flag fgs is terminated.

Thus, in the fuel cell system 1 of the present embodiment, determining the inflow temperature of the coolant and the cell set voltages V1 to Vk enable cell-set temperature differences to be estimated which in turn enable the system to detect the heat generation output of the fuel cell sets S1 to Sk without utilizing temperature sensors at the respective cell sets. Further, by monitoring the heat generation output value of the respective fuel cell sets S1 to Sk, the control unit 3 of the present invention can control the temperature of the cell sets such that they return or remain within allowable ranges. Further, and in accordance with the present configuration, advantageously, there are not introduced cost increases due to provision of temperature sensors corresponding to the respective cell sets, and reduction in reliability due to component increases. In addition, the flow volumes of the coolant do not have to be determined by taking fluctuations in heating value into consideration. Consequently, when no heating value fluctuations take place, the volume of the coolant can be reduced.

Further, according to the fuel cell system 1 of the present embodiment, an assembly temperature difference of the coolant in the fuel cell assembly 2 is calculated from a comparison of the inflow temperature of the coolant flowing into the fuel cell assembly 2 and the outflow temperature of the coolant flowing out therefrom. Then, the cell-set temperature difference is calculated in accordance with the assembly temperature difference of the fuel cell assembly 2, the output voltage Vt of the fuel cell assembly 2, the cell set voltages V1 to Vk of the fuel cell sets S1 to Sk, and the number of the fuel cell sets k. Consequently, the cell-set temperature difference can be calculated with even higher accuracy by the use of the temperature difference of the coolant in the fuel cell assembly 2 and the output voltage Vt of the fuel cell assembly 2.

Furthermore, according to the fuel cell system 1 of the present embodiment, the voltage difference between each of the cell set voltages V1 to Vk and the predetermined voltage is divided by the voltage difference between the output voltage of the fuel cell assembly 2 and the predetermined voltage Vt. The calculation result is then multiplied with the assembly temperature difference and the number k of fuel cell sets. Consequently, the cell-set temperature difference can be calculated with even higher accuracy.

In addition, power generation by the fuel cell assembly 2 automatically terminates when the cell-set temperature difference becomes greater than the predetermined value. Consequently, the respective fuel cell sets S1 to Sk can be prevented from having a thermal stress higher than a design value. As a consequence, the individual fuel cell sets S1 to Sk do not have to be provided with temperature margins in order to withstand increases in heating value associated with, for example, heating value fluctuations and/or time dependent deterioration of the fuel cell. For this reason, a system can be kept from being unintentionally terminated due to heat damaged components.

It will be understood that the flow volume of the coolant is controlled in accordance with the cell-set temperature difference, thereby enabling the flow volume of the coolant to be regulated such that the individual fuel cell sets S1 to Sk are not exposed to a higher thermal stress higher level than what they were designed to withstand.

Further, according to the fuel cell system 1 of the present embodiment, the cell-set outflow temperature is estimated in accordance with the cell-set temperature difference and the inflow temperature of the coolant flowing into the fuel cell assembly 2. Therefore, while individual temperature sensors at each fuel cell sets S1 to Sk are not provided, heat generation states of the respective fuel cell sets S1 to Sk are detectable. The heat generation output values of the respective fuel cell sets S1 to Sk can thus be controlled to remain within or return to allowable ranges. Specifically, where the heat generation output value is greater than a predetermined threshold value, the control unit 3 can cause the power generation output of the fuel cell assembly to terminate or alternatively to be reduced.

In addition, according to the fuel cell system 1 of the present embodiment, the coolant flow volume is controlled in accordance with the cell-set outflow temperature. Accordingly, the flow volume of the coolant can be regulated to prevent the respective fuel cell sets S1 to Sk from reaching a temperature higher than what they were designed to withstand.

Further, according to the fuel cell system 1 of the present embodiment, the output voltage of the fuel cell assembly 2 is calculated by totaling the cell-set voltages measured corresponding to the fuel cell sets S1 to Sk. Consequently, the system control can be accomplished without provision of the output voltage sensor Vt that measures the output voltage of the fuel cell assembly 2.

In the fuel cell system 1 of the present embodiment, the number of fuel cells constituting the fuel cell sets S1 to Sk can be between one and a number equal to the total number of cells of the fuel cell assembly 2. Consequently, with "1" being set to the number of cells of the cell set, the cell-set temperature difference can be estimated not only in the unit of each fuel cell set, but also in the units of each cell.

A second embodiment of the present invention will be described hereinbelow with reference to the drawings. Since the configuration of a fuel cell system of the second embodiment is the same as that of the above-described first embodiment, a duplicated detailed description will be omitted herefrom. A system control process in the second embodiment is also the same as that according to the first embodiment described with reference to FIG. 2.

Figure 6:
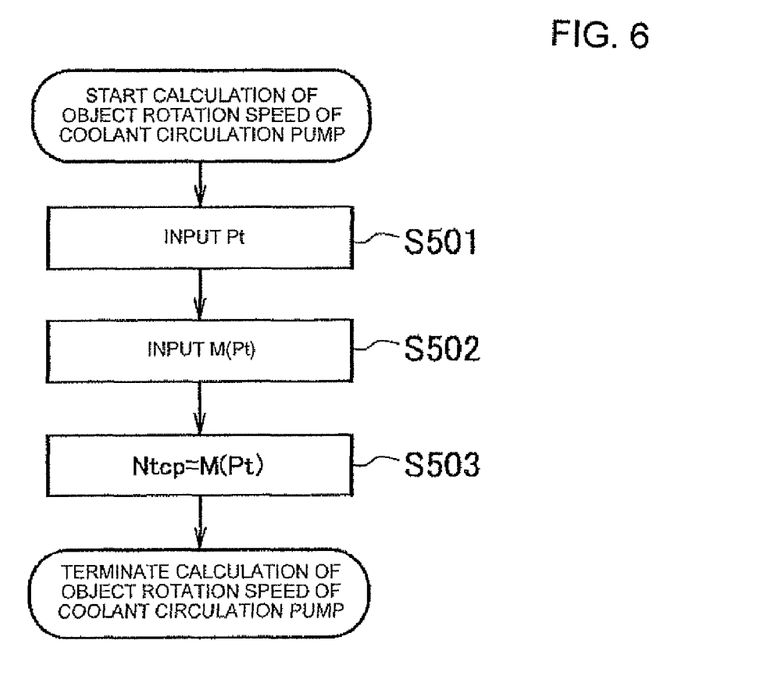
FIG. 6 is a flow chart showing a process for calculating an object rotation speed of a coolant circulation pump in the fuel cell system according to the first embodiment of the invention.

Referring now to FIG. 6, a flow chart showing a calculation process for an object rotation speed Ntcp of the coolant circulation pump 5 in the fuel cell system according to the second embodiment is shown. In this embodiment, the calculation process is carried out in lieu of the process described in conjunction with FIG. 3. As shown in the flow chart of FIG. 6, the outset of the process involves inputting a command power Pt datum for the fuel cell assembly 2 (step S501). A rotation speed calculation table M(Pt) of the coolant circulation pump 5 is then input in response to the command power Pt datum for the fuel cell assembly 2 (step S502). In order to calculate the object rotation speed of the circulation pump 5, the command power Pt datum is then input to the rotation speed calculation table M(Pt)(step S503). Thereafter, the calculation process for the object rotation speed Ntcp of the coolant circulation pump 5 terminates.

Figure 7:
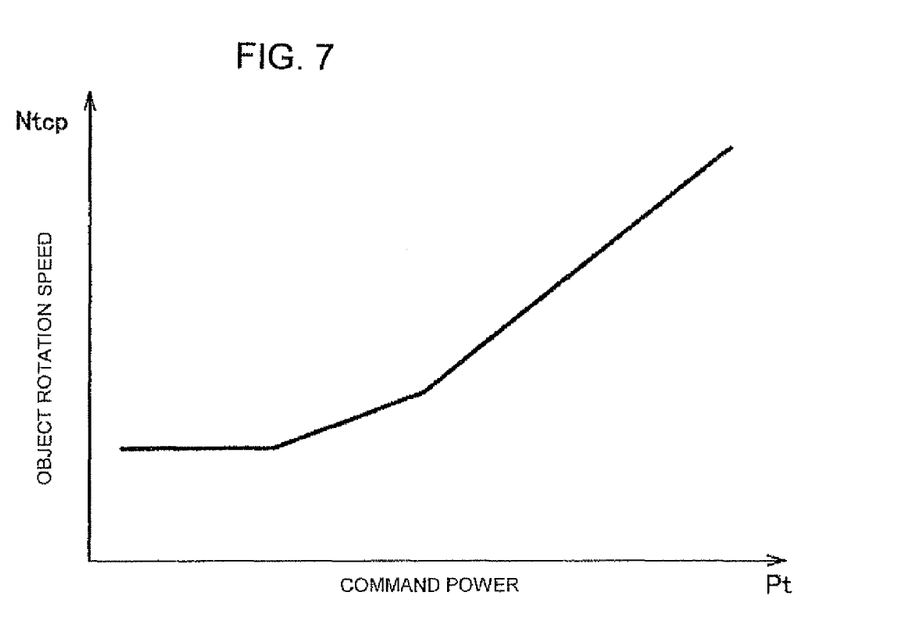
FIG. 7 is a graph showing calculation data for calculating an object rotation speed of the coolant circulation pump.

With reference to FIG. 7, the rotation speed calculation graph M(Pt) shows the temperature of the fuel cell assembly 2 in response to the command power Pt datum for the fuel cell assembly 2 and a flow volume of the coolant necessary for cooling the fuel cell assembly 2 to a predetermined temperature or lower. As will be understood by persons having ordinary skill in the art, the temperature and the flow volume are preliminarily obtained in the design stage or in accordance with the results of experiments. The rotation speed calculation table M(Pt) is stored in the control unit 3. Generally, and as shown in FIG. 7, as the command power Pt value increases, the rotation speed of the coolant circulation pump 5 tends to increase. Typically, this is shown in such a fond as "rightward elevation" in proportion to the increase of the command power Pt.

Figure 8:
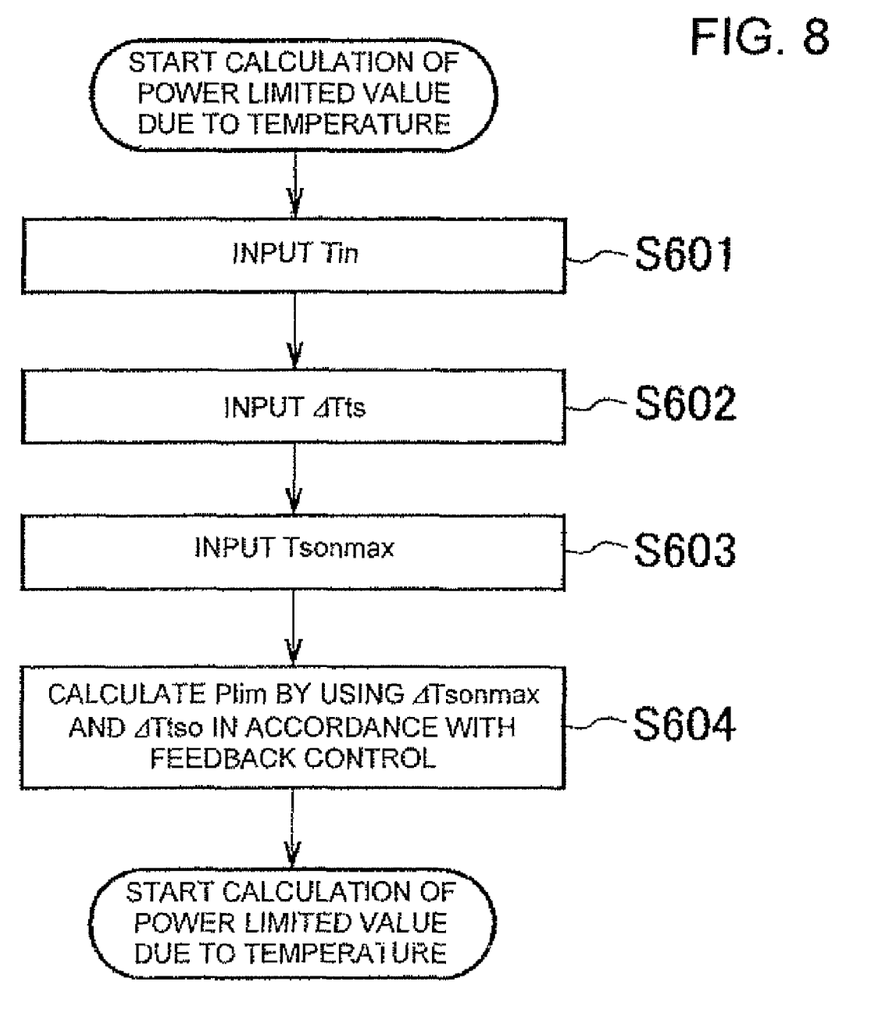
FIG. 8 is a flow chart showing a process for calculating limited power value for a fuel cell assembly in a fuel cell system according to a second embodiment of the present invention.

As will be recalled, in the first embodiment, the process is executed under the condition "limited power Plim of the fuel cell assembly 2=command power Pt". However, according to the fuel cell system of the first embodiment, the limited power Plim of the fuel cell assembly 2 is obtained by calculation. FIG. 8 is a flow chart showing a calculation process for the limited power Plim for the fuel cell assembly 2 in the fuel cell system of the present embodiment. As illustrated in FIG. 8, at the outset of the calculation process an inflow temperature Tin of the coolant flowing into the fuel cell assembly 2 is input (step S601). Then, an object value ΔTts of the cell-set temperature difference of the respective one of the fuel cell sets S1 to Sk is input (step S602). In this case, a person having ordinary skill in the art will understand that an object value of the cell-set outflow temperature of an individual fuel cell set S1 to Sk can be used in lieu of the object value ΔTts of the cell-set temperature difference.

The maximum value Tsonmax of the cell-set outflow temperatures Tsol to Tsok of the coolant flowing out from the fuel cell sets S1 to Sk is then input (step S603). Thereafter, a difference ΔTsonmax between the maximum value Tsonmax and the inflow temperature Tin is obtained. Feedback control such as represented by PI control is then executed by using the difference ΔTsonmax and the object value ΔTts in order to calculate a limited power Plim, which is the maximum power extractable from the fuel cell assembly 2. Subsequently, the calculation process for the limited power Plim of the fuel cell assembly 2 terminates.

Thus, according to the fuel cell system of the present embodiment, the maximum value of power generated by the fuel cell assembly 2 is calculated in accordance with the cell-set temperature difference. For this reason, the amount of power generated by the fuel cell assembly 2 can be regulated by the use of the cell-set temperature difference. Thus, the fuel cell sets S1 to Sk can be prevented from having a thermal stress higher than a design value. Further, the maximum value of the power generated by the fuel cell assembly 2 is also calculated in accordance with the cell-set outflow temperature. Therefore, the amount of power generated by the fuel cell assembly 2 can be regulated and the fuel cell sets S1 to Sn can be prevented from reaching a temperature higher than the design value.

Figure 9:
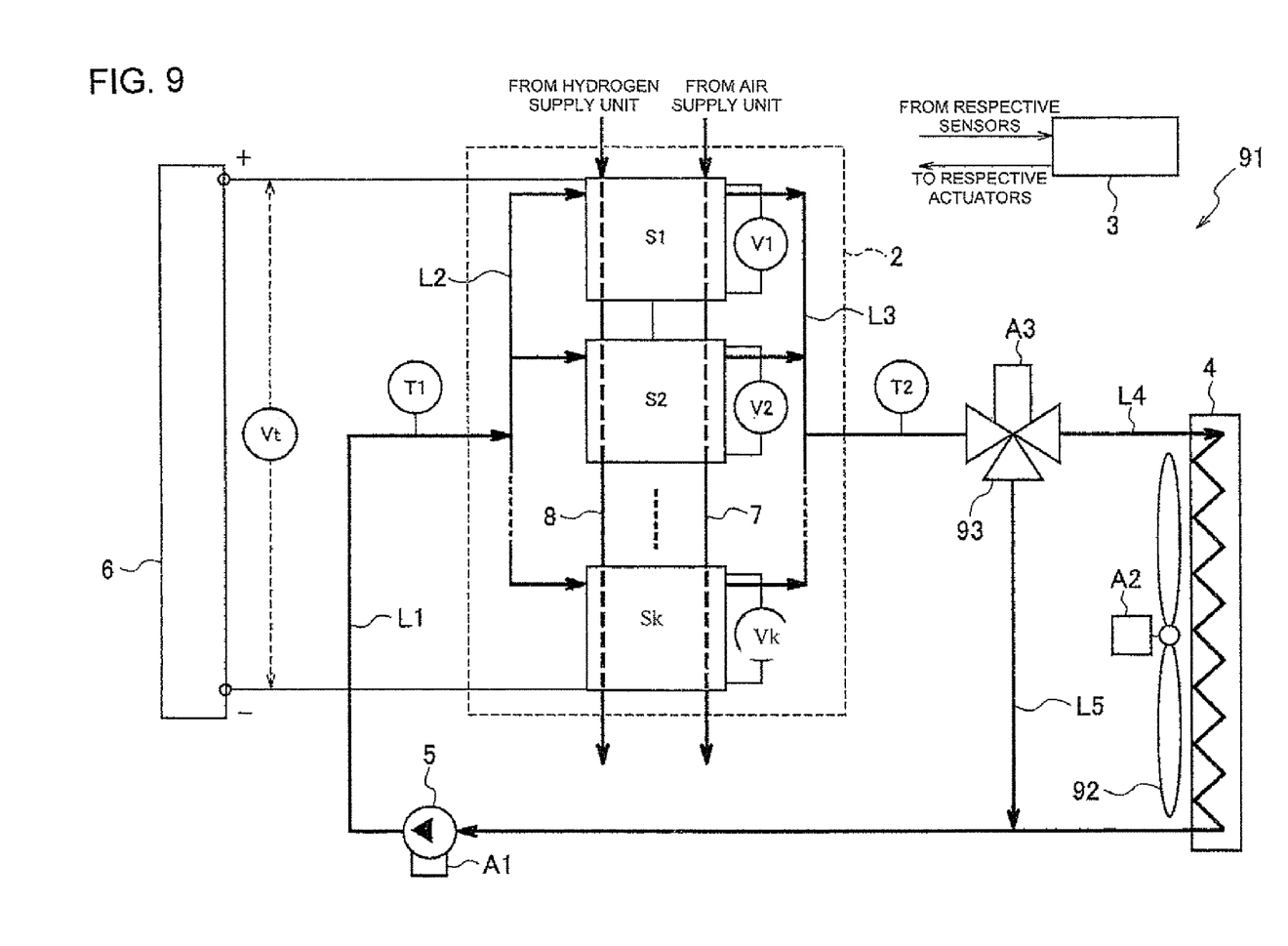
FIG. 9 is a block diagram showing the configuration of a fuel cell system according to a third embodiment of the present invention.

A third embodiment of the present invention will be described here in below with reference to FIG. 9. FIG. 9 is a block diagram showing the configuration of a fuel cell system 91 of the third embodiment.

With reference to FIG. 9, the fuel cell system 91 of the present embodiment includes all components described and featured with respect to the first embodiment as well as additional members as described herein. Specifically, the additional members can include a cooling fan 92, for blowing a cooling airflow to the radiator 4; a fan actuator A2, for actuating the cooling fan 92; a bypass flow pathway L5, adapted to permit the coolant to bypass the radiator 4; a three-way valve 93, for dividing coolant flow such that it can flow to the radiator 4 and to bypass flow pathway L5; and a three-way valve actuator A3, for regulating the opening of the three-way valve 93. Otherwise, the configuration of this embodiment is similar to that of the first embodiment, and therefore, duplicated detail descriptions will be omitted. Persons having ordinary skill in the art will understand that variations of embodiment three, including different elements, can be made without departing from the novel scope of the present embodiment.

In the fuel cell system 91 of the present embodiment, the amount of heat being dissipated from the system by the radiator 4 is regulated by the use of the cooling fan 92 and the three-way valve 93. The regulation is done to improve temperature controllability of the fuel cell assembly 2 during power generation.

Figure 10:
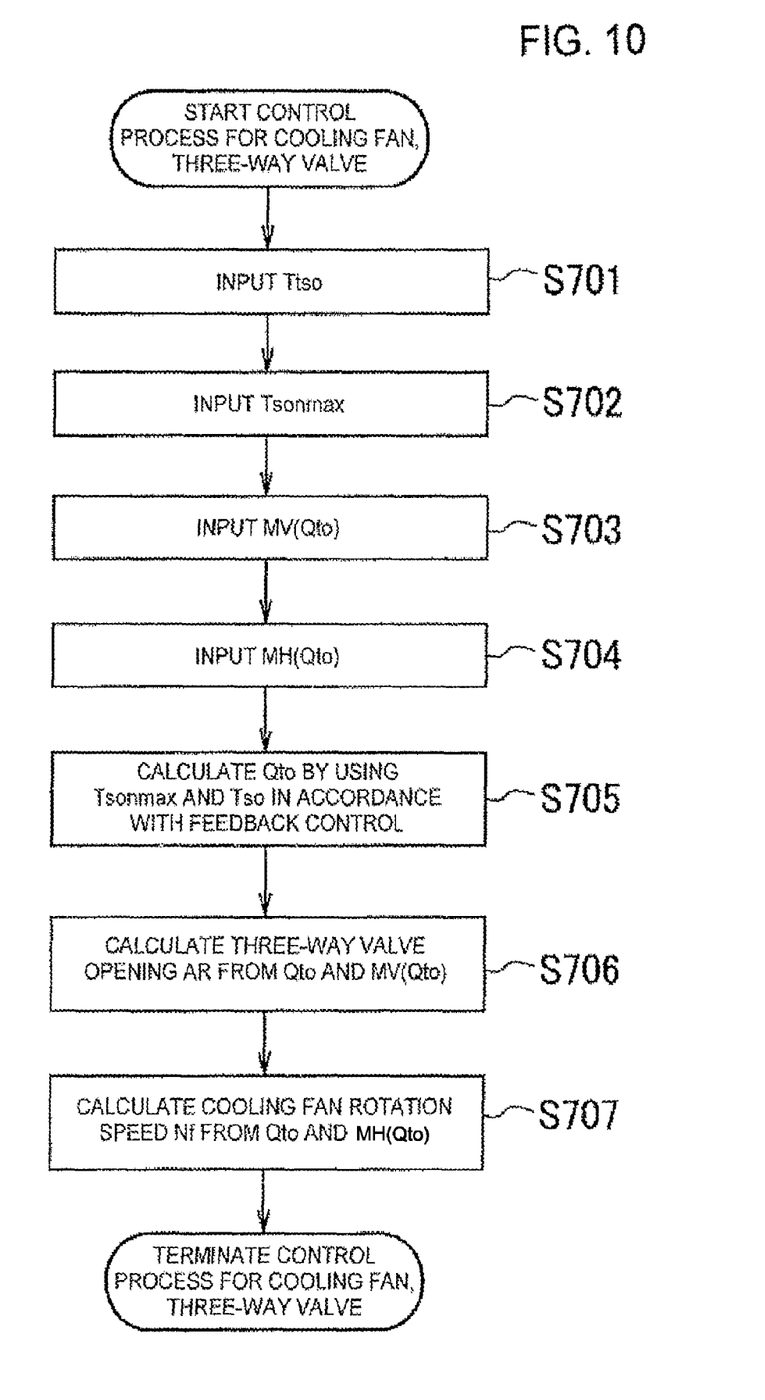
FIG. 10 is a flow chart showing a process for controlling a cooling fan and a three-way valve in a fuel cell system according to the third embodiment of the present invention.

A control process for controlling the cooling fan 92 and the three-way valve 93 in the fuel cell system 91 of the present embodiment is further provided and will be described hereinbelow with reference to the flow chart of FIG. 10. Referring now to FIG. 10, the control process begins when the object value Ttso of the cell-set outflow temperature of the coolant flowing out from the respective fuel cell sets S1 to Sk is input (step S701). The maximum value Tsonmax of the cell-set outflow temperature of the coolant is then input (step S702). In this case, however, it will be understood by persons having ordinary skill in the art, that the cell-set outflow temperature can be replaced with a cell-set outflow temperature coincident with the temperature difference between the temperatures of the coolant flowing into and flowing out from the individual fuel cell sets S1 to Sk.

In the next step of the control process, an opening calculation table Mv(Qto) defining the opening position of the three-way valve 93, for an object radiation value Qto of the radiator 4, is input (step S703). A rotation-speed calculation table MH(Qto) defining the rotation speed of the cooling fan 92 for the object radiation value Qto is then input (step S704).

The opening calculation table Mv(Qto) and the rotation-speed calculation table MH(Qto) are control tables stored in the control unit 3. The tables contain design values preliminarily obtained through, for example, investigations involving research and experiments regarding the relationship between the radiation values of heat and the flow volume of the coolant flowing into the radiator 4 as well as the relationship between the radiation values of the heat being dissipated from the radiator 4 and the amounts of airflows to the radiator 4. Feedback calculation using, for example PI control, is next carried out from the input object value Ttso, of the cell-set outflow temperature, and the input maximum value Tsonmax, of the cell-set outflow temperature; in order to calculate the object radiation value Qto for the radiator 4 (step S705).

The calculated object radiation value Qto is then input into the opening calculation table Mv(Qto) in order to calculate the three-way value opening (step S706) and into the rotation-speed calculation table Mh(Qyo) to calculate the rotation speed of the cooling fan 92 (step S707). The control process for the cooling fan 92 and the three-way valve 93 in the fuel cell system 91 of the present embodiment terminates.

Figure 11:
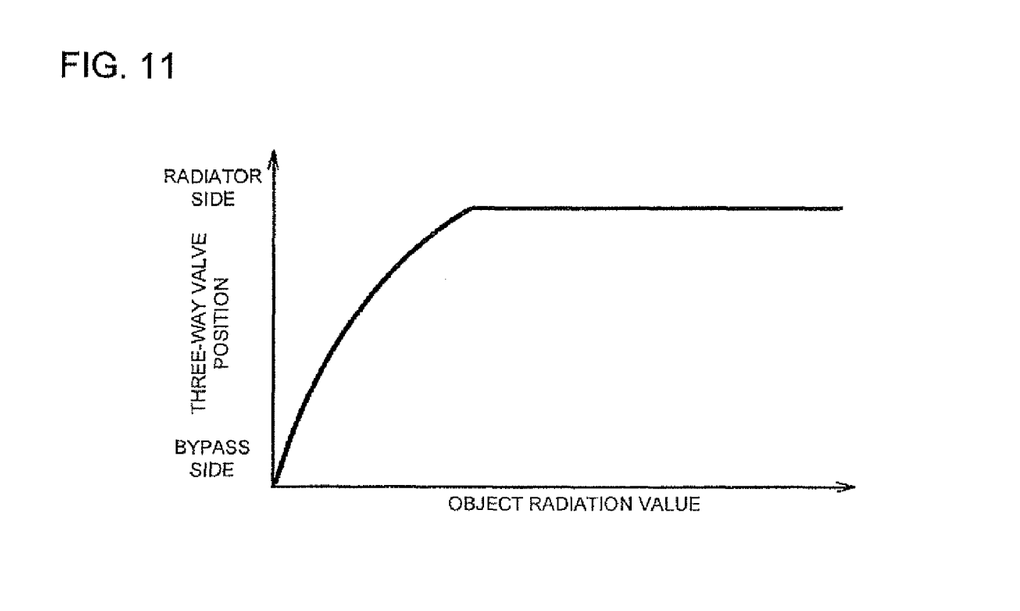
FIG. 11 is a graph showing calculation data for positioning the three-way valve.
Figure 12:
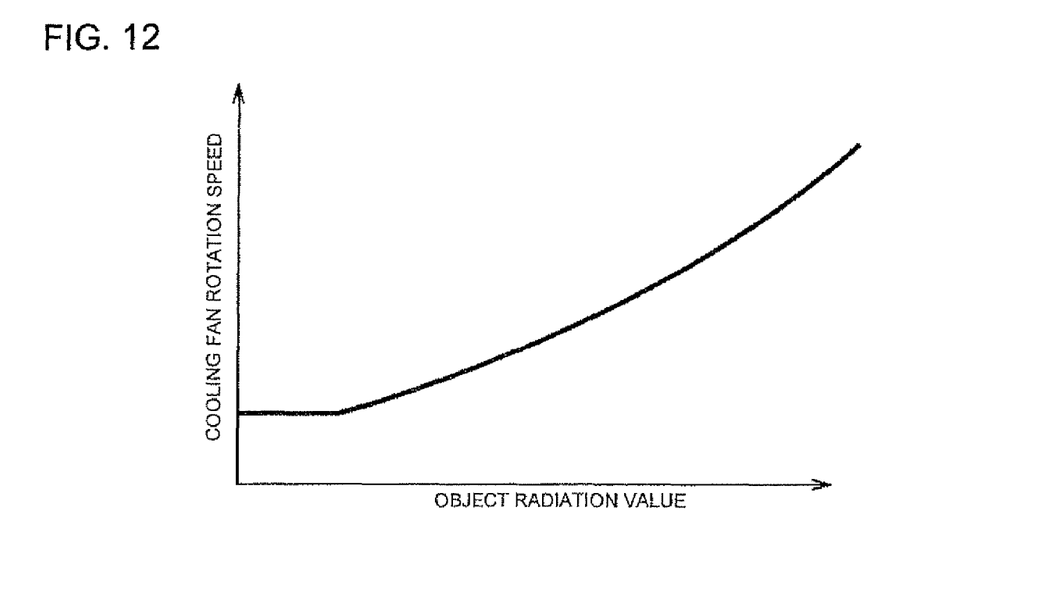
FIG. 12 is a graph showing calculation data for determining the rotation speed of the cooling fan.

Examples of the opening calculation data Mv (Qto) for the three-way valve 93 and the rotation-speed calculation data MH (Qto) for the cooling fan 92 are shown in FIGS. 11 and 12, respectively. As shown in FIG. 11, in the opening calculation data Mv (Qto), the values are set such that, as the object radiation value increases, the opening of the three-way valve 93 shifts from the side of the bypass flow pathway L5 to the side of the radiator 4. Similarly, as shown in FIG. 12, the rotation speed of the cooling fan 92 is set to increase as the object radiation value increases.

The three-way valve actuator A3 of the present embodiment is controlled by the control unit 3 to attain a desired size of the opening of the three-way valve 93. Thereby, the distribution of flow volumes flowing into the bypass flow pathway L5 and the radiator 4 are more closely controlled. In addition, the fan actuator A2 is controlled such that the rotation of the cooling fan 92 can be adjusted to or maintained at a desired speed.

Thus, in the fuel cell system 91 of the present embodiment, components such as the cooling fan 92 and the three-way valve 93 are controlled in accordance with the cell-set temperature difference. Consequently, the components can be controlled to prevent the respective one of the fuel cell sets S1 to Sk from reaching a thermal stress level higher than a design value.

According to the fuel cell system 91 of the present embodiment, additional responsive components such as a cooling fan 92 and three-way valve 93 can also be controlled by the control unit 3 in accordance with the cell-set outflow temperature. Consequently, the object radiation value of heat from the radiator 4 can be regulated to prevent the individual fuel cell sets S1 to Sk from reaching a temperature higher than what they were designed to withstand.

A method of controlling the temperature of a fuel cell assembly having a plurality of electrically connected fuel cell sets is further provided by the present invention. The method includes the steps of detecting a cell-set voltage value, in units, at an individual fuel cell set; detecting the inflow temperature of the coolant flowing into the fuel cell assembly; transmitting the detected voltage values and temperature as a signal to be received by a control unit; estimating the cell-set temperature difference from the detected voltage values and temperature; determining a heat generation output value of the individual cell sets; evaluating the heat generation output value against a predetermined value; and directing responsive components of the fuel cell assembly to operate in a manner sufficient to maintain or return the temperature of the fuel cell assembly within a predetermined range.

The present disclosure includes that which is contained in the appended claims, as well as that of the forgoing description. Although, the present invention has been described in its preferred form with a certain degree of particularity, it is understood that the present disclosure of the preferred form has been made only by way of example, and that numerous changes in the details of the elements, compositions and the combination of individual ingredients may be resorted to without departing from the novel spirit or scope of the invention.

What is claimed is:

1. A fuel cell system comprising:
    a fuel cell assembly having a plurality of fuel cell sets in electrical communication, each fuel cell set generating power through an electrochemical reaction between a fuel gas and an oxidant gas;
    a plurality of cell-set voltage sensors, each voltage sensor associated with a fuel cell set to detect a cell-set voltage at the fuel cell set and to further transmit each cell-set voltage as a signal;
    a coolant circulation system for supplying a coolant to the fuel cell sets of the fuel cell assembly;
    a coolant inlet temperature sensor positioned along the circulation system that detects an inflow temperature of the coolant flowing into the fuel cell assembly and transmits the inflow temperature as a signal; and
    a control unit programmed to receive the signals transmitted from the voltage and temperature sensors, to estimate a cell-set temperature difference of each fuel cell set according to the inflow temperature and a respective cell-set voltage and to control the circulation of coolant through the coolant circulation system according to the cell-set temperature difference, wherein the cell-set temperature difference is a difference in temperature between the coolant being delivered to an associated fuel cell set and that of the coolant being exhausted from the fuel cell assembly.

2. The fuel cell system according to claim 1 wherein the control unit is programmed to estimate the cell-set temperature difference by performing a calculation in which a voltage difference between the respective cell-set voltage and a predetermined voltage is multiplied by a power generation current of the associated fuel cell set to obtain a value, the value being divided by a specific heat value and divided again by an object flow volume value of the coolant flowing into the associated fuel cell set.

3. The fuel cell system according to claim 1, further comprising:
    a coolant outlet temperature sensor positioned along the circulation system to detect an outflow temperature of the coolant flowing out from the fuel cell assembly and to further transmit the outflow temperature as a signal; and
    an output voltage sensor for detecting an output voltage of the fuel cell assembly, wherein the control unit is programmed to calculate an assembly temperature difference from the inflow temperature of the coolant flowing into the fuel cell assembly and the outflow temperature of the coolant flowing out from the fuel cell assembly and to estimate the cell-set temperature difference by evaluating the assembly temperature difference, the output voltage of the fuel cell assembly, the cell-set voltages of the fuel cell sets, and a number of the fuel cell sets.

4. The fuel cell system according to claim 3, wherein the control unit is programmed to estimate the cell-set temperature difference of each fuel cell set by performing a calculation wherein a voltage difference between the respective cell-set voltage and a predetermined voltage is quantified and then divided by a voltage difference between the output voltage and a predetermined voltage value to obtain a value, the value being multiplied by the assembly temperature difference and again by the number of the fuel cell sets.

5. The fuel cell system according to claim 3, wherein the control unit is programmed to calculate the output voltage of the fuel cell assembly by performing a calculation wherein the cell-set voltages detected at the fuel cell sets are summed.

6. The fuel cell system according to claim 1, wherein the control unit is programmed to estimate a cell-set outflow temperature at each fuel cell set by evaluating the cell-set temperature difference and the inflow temperature of the coolant flowing into the fuel cell assembly.

7. The fuel cell system according to claim 1, wherein the control unit is programmed to terminate power generation output by the fuel cell assembly when the cell-set temperature difference is greater than a predetermined value.

8. The fuel cell system according to claim 1, wherein the control unit is programmed to reduce power generation output by the fuel cell assembly when the cell-set temperature difference is greater than a predetermined value.

9. The fuel cell system according to claim 1, wherein the control unit is programmed to direct the coolant circulation system to increase the rate of flow of the coolant flowing into the fuel cell assembly when the cell-set temperature difference is greater than a predetermined value.

10. The fuel cell system according to claim 1, further comprising:
a coolant cooling unit positioned along the coolant circulation system for cooling the coolant flowing away from the fuel cell assembly, the control unit programmed to direct the fuel cell assembly to increase the rate of flow of the coolant flowing into the coolant cooling unit when the cell-set temperature difference is greater than a predetermined value.

11. The fuel cell system according to claim 1, wherein a number of individual fuel cells constituting each fuel cell set is a number in the range of from one to a number one less than a total number of cells of the fuel cell assembly.

12. A method of controlling a temperature of a fuel cell assembly having a plurality fuel cell sets in electrical communication, comprising:
detecting a cell-set voltage at each fuel cell set;
detecting an inflow temperature of a coolant flowing into the fuel cell assembly;
estimating a cell-set temperature difference from the detected voltage values and the inflow temperature, wherein the cell-set temperature difference is a difference in temperature between the coolant being delivered to a respective fuel cell set and that of the coolant being exhausted from the fuel cell assembly;
evaluating the cell-set temperature difference against a predetermined value; and
directing components of the fuel cell assembly to operate so as to maintain, or return, the temperature of the fuel cell assembly within a predetermined range based on a relationship of the cell-set temperature difference to the predetermined value.

13. The method of claim 12 wherein the cell-set voltage of each fuel cell set is detected by a respective cell set voltage sensor.

14. The method of claim 12 wherein the inlet temperature of the coolant flowing into the fuel cell assembly is detected by an inlet temperature sensor positioned along a coolant circulation system.

15. The method of claim 12 wherein estimating the cell-set temperature difference is determined by performing the following calculation for each fuel cell set:
multiplying a value representing the difference between the cell-set voltage and a predetermined voltage based on a power generation current of the fuel cell set to obtain a first value;
dividing the first value by a value representing a specific heat of the coolant to obtain a second value; and
dividing the second value by a value representing an object flow volume of the coolant flowing into the fuel cell set.

16. The method of claim 12 further comprising:
detecting an outflow temperature of the coolant flowing out from the fuel cell assembly;
detecting an output voltage of the fuel cell assembly; and
using the outflow temperature and output voltage in the estimating of the cell-set temperature difference.

17. The method of claim 16 wherein estimating the cell-set temperature difference is determined by performing the following calculation for each fuel cell set:
multiplying a value representing a difference between the cell-set voltage and a predetermined voltage by a number of fuel cell sets in the fuel cell assembly to obtain a first value;
multiplying a value representing a difference between the output voltage and a predetermined voltage by a difference between the inflow and outflow temperatures to obtain a second value; and
dividing the first value by the second value.

* * * * *